(No Model.)
J. F. PACKER.
HELM FOR PLOWS.
No. 440,647. Patented Nov. 18, 1890.
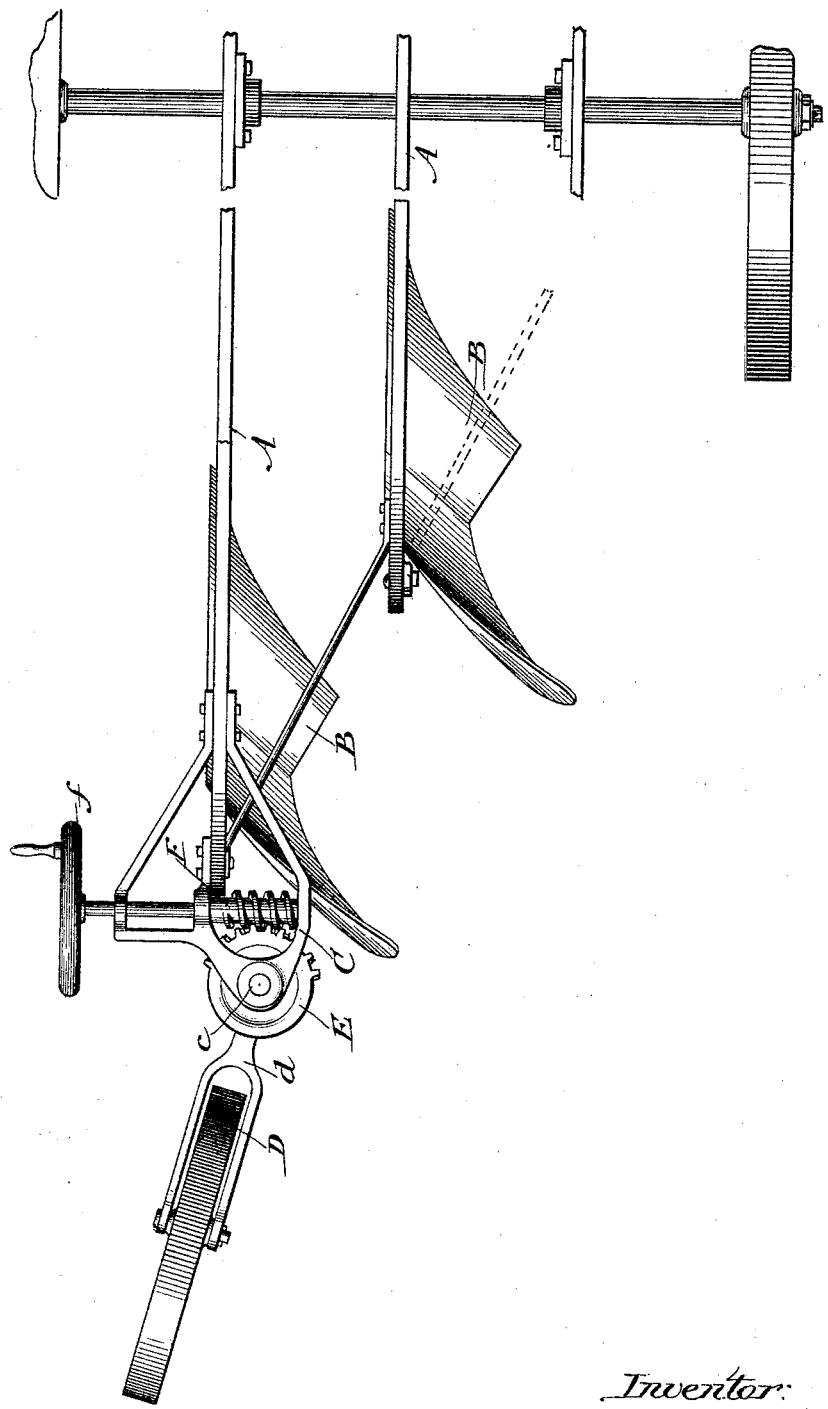
Witnesses:
Albert H. Adams.
Harry T. Jones.
Inventor:
John F. Packer

UNITED STATES PATENT OFFICE.

JOHN F. PACKER, OF CHICAGO, ILLINOIS, ASSIGNOR TO THE DAVID BRADLEY MANUFACTURING COMPANY, OF SAME PLACE.

HELM FOR PLOWS.

SPECIFICATION forming part of Letters Patent No. 440,647, dated November 18, 1890.

Application filed April 5, 1890. Serial No. 346,705. (No model.)

*To all whom it may concern:*

Be it known that I, JOHN F. PACKER, residing at Chicago, county of Cook, and State of Illinois, and a citizen of the United States, have invented a new and Improved Helm for Plows, of which the following is a specification, reference being had to the accompanying drawing, in which the figure is a top or plan view of a portion of the plow with the helm applied thereto.

This invention is primarily designed to be applied to sulky or gang plows for plowing hillsides to hold the plow up against its tendency to slide downward or sidewise; but may be applied to any plow which it is desired to guide.

The object of this invention is to provide a helm for plows in connection with a caster-wheel, whereby the plow can be caused to cut a wider or narrower furrow and be held against its tendency to slide sidewise in plowing hillsides, which I accomplish as illustrated in the drawing and as hereinafter described.

That which I claim as new will be pointed out in the claim.

In the drawing, A represents the plow-beam or plow-frame.

B represents the plow or plows.

C represents an arm or bracket extending in rear of the rear plow B.

D represents a caster-wheel, the forward end of whose standard $d$ is pivotally mounted on a pivot $c$ in the arm or bracket C.

E is a wheel or disk secured upon the pivot $c$. The periphery of this wheel or disk E or a portion thereof is provided with gear-teeth.

F is a worm supported in bearings in the bracket C, and engaging with the teeth of the wheel or disk E. This worm-gear F may be rotated by a hand-wheel $f$ or other suitable device.

The disk or wheel E is rigidly secured to the pin $c$ or to the arm $d$, so that when it is partially rotated it will throw the caster-wheel to the right or left of the pin $c$, as shown in the figure. The rotation of the worm F will partially rotate the wheel or disk E, which will shift the caster-wheel to the right or left, as may be desired, and the worm-gear will hold the caster-wheel in the shifted or adjusted position.

By means of the device above described the plow B, or the forward plow B of a gang of plows, may be caused to cut a wider or narrower furrow, as the shifting of the caster-wheel D to the left will bear the frame of the plow to the right, and the shifting of the caster-wheel to the right will bear the frame of the plow to the left.

In plowing on hillsides the caster-wheel may be shifted to the right or left, as necessary, to hold the plow up, and thereby overcoming the tendency of the plow to slide downward or sidewise.

Only so much of a plow is shown as is necessary to illustrate the application and operation of my device. It will be understood that it may be applied to either a single plow or to a gang-plow, it being applied in rear of the rear plow, so that the caster-wheel will run in the furrow. The hand-wheel $f$ may be arranged in convenient position for the operator.

What I claim as new, and desire to secure by Letters Patent, is—

The combination, with a plow beam or frame, of a caster-wheel, a wheel or disk E, and worm-gear F, substantially as and for the purpose specified.

JOHN F. PACKER.

Witnesses:
HARRY T. JONES,
ALBERT H. ADAMS.